United States Patent [19]

O'Hara

[11] Patent Number: 5,488,800
[45] Date of Patent: Feb. 6, 1996

[54] SPRING OPERATED ANIMAL TRAPS WITH STICKY TRIGGER

[76] Inventor: Alan J. O'Hara, Box 2156, St. Thomas, Virgin Islands (U.S.), 00803

[21] Appl. No.: 238,887

[22] Filed: May 6, 1994

[51] Int. Cl.[6] ................................................. A01M 23/30
[52] U.S. Cl. .............................................................. 43/81
[58] Field of Search .............................. 43/81, 81.5, 82, 43/83, 70, 72, 92, 95

[56] References Cited

U.S. PATENT DOCUMENTS

| | | | |
|---|---|---|---|
| 1,464,559 | 8/1923 | Britan | 43/81 |
| 2,263,161 | 11/1941 | Brust | 43/81 |
| 2,517,928 | 8/1950 | Richards | 43/81 |
| 2,563,324 | 8/1951 | Evans | 43/81 |
| 3,055,140 | 9/1962 | McAllister | 43/81 |
| 5,001,857 | 3/1991 | McDaniel et al. | 43/81 |
| 5,375,367 | 12/1994 | Pust | 43/81 |

*Primary Examiner*—P. Austin Bradley
*Assistant Examiner*—Chuck Y. Mah
*Attorney, Agent, or Firm*—Alvin S. Blum

[57] ABSTRACT

A spring operated animal trap in which the bail or striker is held against spring tension by a striker hold down bar engaging a trigger member. A bait holder connected to the trigger may be surface coated with an adhesive so that after the animal touches the adhesive, movement will actuate the trigger and spring the trap before the animal can free itself. A unique tilting trigger mechanism is disclosed in which the bait holder and trigger are arranged to pivot about a horizontal axis above the base. The axis being parallel to the hold down bar, with tilting of the bait holder to either side springing the trap.

14 Claims, 1 Drawing Sheet

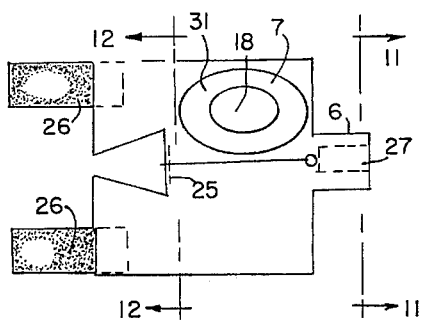
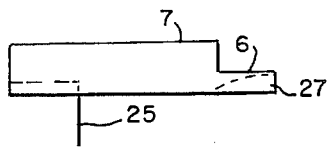
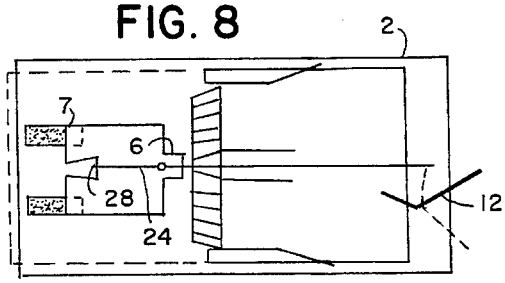
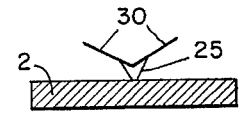
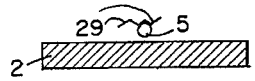
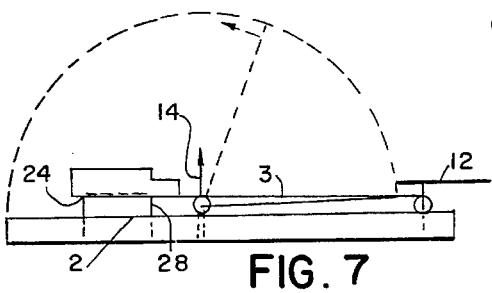
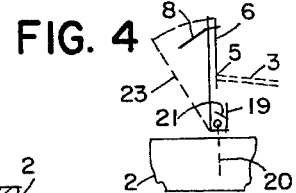
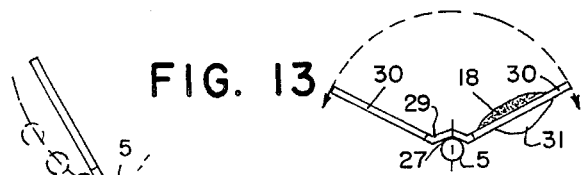
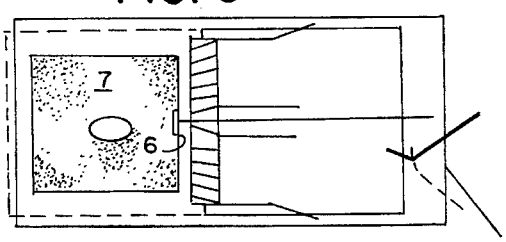
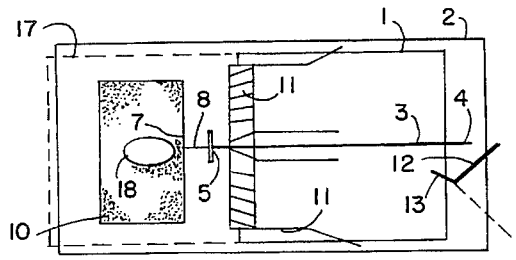
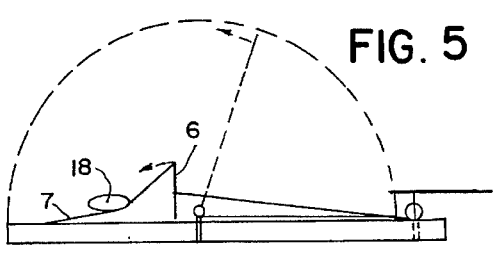
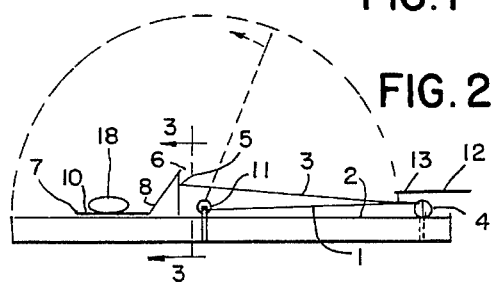

5,488,800

SPRING OPERATED ANIMAL TRAPS WITH STICKY TRIGGER

BACKGROUND OF THE INVENTION

This invention relates to animal traps of the spring biased wire bail type and more particularly to such traps with improved trigger mechanisms.

Well known in the art for economy of construction are rodent traps which employ a finger settable spring-biased wire loop or bail actuated by a baited trigger mechanism. These are advantageous because they instantly destroy the animal for immediate disposal in contrast to holding or confining traps or poisons. Traps of this type will often fail to catch the animal because the trigger was not sensitive enough to actuate at the proper time. If made too sensitive to touch, the trap may actuate while being positioned and may even injure the fingers of the user.

U.S. Pat. No. 2,962,836 issued Dec. 6, 1960 to Hughes and U.S. Pat. No. 3,398,478 issued Aug. 27, 1968 to Pearsall overcome these problems by a trap employing an adhesive surface so tenaceous that the animal will be unable to disengage from the surface once in contact. This leaves the user with a live animal to be disposed of. Furthermore, the animal may pull free after an initial contact of less than the entire body, leaving behind fur, or appendages. Such an animal will be especially wary of traps thereafter.

SUMMARY OF THE INVENTION

It is accordingly an object of the invention to provide an animal trap that will hold and kill an animal when sprung while being inexpensive to manufacture, yet safe and easy to use. It is another object that the trap be very sensitive to animal activity without being so sensitive that it carnet be easily set and positioned. It is yet another object to provide a bait pan with releasable adhesive on its surface for sticking to the animal so that motion of the animal thereafter will spring the trap. It is yet another object that the adhesive be of such slight tenacity that the animal may be readily released therefrom for reuse of the adhesive.

The trap of the invention employs a conventional flat base with a spring loaded bail or striker loop pivotally attached to the base. A conventional hold down bar is pivotally attached at one end to the base and the other end releasably engages a movable trigger element to hold the bail cocked. A movable bait holder attached to the trigger moves the trigger away from the hold down bar to spring the trap when an animal moves the bait holder. The bait holder surface is provided with a low tenacity adhesive so that when the animal touches it, any movement thereafter will actuate the trigger. Thus the trap may be more sensitive to the animal without being so sensitive to any movement of the whole trap. The bait holder may be supported in such a way that it tilts easily from side to side under animal activity, while the trigger mechanism affixed to one end of the bait holder releases the hold down bar whenever the bait holder is tilted. Both the sticky trigger and side tilting mechanisms may be combined. A safety catch may also be provided to prevent the striker from catching a finger.

These and other objects, advantages and features of the invention will become more apparent when the detailed description is considered in conjunction with the accompanying drawings.

BRIEF DESCRIPTION OF THE DRAWINGS

FIG. 1 is a plan view of a trap in cocked position.

FIG. 2 is a side view of the trap of FIG. 1.

FIG. 3 is a sectional view taken through line 3—3 of FIG. 2.

FIG. 4 is a detailed side view of the trigger member of FIG. 1.

FIG. 5 is a side elevation view of another trap embodying the invention.

FIG. 6 is a plan view of the trap of FIG. 5.

FIG. 7 is a side elevation view of another trap embodying the invention.

FIG. 8 is a plan view of the trap of FIG. 7.

FIG. 9 is an enlarged detail of the bait holder of the trap of FIG. 8.

FIG. 10 is a side elevation view of the bait holder of FIG. 9.

FIG. 11 is a sectional view taken on line 11—11 of FIG. 9.

FIG. 12 is a sectional view taken on line 12—12 of FIG. 9.

FIG. 13 is a diagrammatic representation of the stable, cocked condition of the trigger of FIG. 11.

FIG. 14 is a diagrammatic representation of the firing condition of the trigger of FIG. 11 when the bait pan has been tilted.

DETAILED DESCRIPTION OF PREFERRED EMBODIMENTS

Referring now first to FIGS. 1–4, a trap for a rat or mouse comprises a conventional wooden base 2 upon which is pivotally mounted a striker element or bail 1 shown in solid lines in cocked position and in phantom lines 17 in sprung position for trapping a rodent in FIG. 1. Springs 11 drive the striker from cocked to sprung position in a well known manner. A striker hold down bar 3 is pivotally attached at end 4 to the base and lies over the striker and is removably attached at its free end 5 to trigger member 6. Trigger 6 has an upturned lower portion 19 forming a trough for receiving a staple 20 for pivotally supporting the trigger about an axis transverse to the hold down bar 3. A tab 21 struck out of 19 locks the staple 20 in place. A hole 22 in trigger 6 receives the end 5 of the bar 3 while the imperforate wall behind it limits penetration of the bar 3 for ensuring reproducible positioning and thereby sensitivity. Spring tension of the striker 1 against the bar 3 forces trigger 6 upward and holds bar end 5 within hole 22 so that it will be released when the trigger is pulled away from bar 3 as shown in phantom at 23. A bait holder 7, supporting bait 18, has an adhesive upper surface 10. This adhesive is of reduced tenacity such that animal parts or fur adherent thereto may be readily pulled away. A cord 8 such as a monofilament line or rod connects the bait holder 7 to the trigger member 6. When the animal touches the adhesive surface while going for the bait, it sticks to the surface. When pulled away, the adhesive is sufficiently sticky that it will hold onto the animal and the cord 8 will be pulled enough to pull the trigger away from the hold down bar as shown at 23 before releasing the animal. The releasing of end 5 of hold down bar 3 springs or actuates the trap, the striker pivots under force of springs 11 to position 17, striking and trapping the animal. To avoid accidental catching of the user's fingers, a T bar safety element 12 is pivotally mounted on base 2. It can be rotated to the safety position shown in which a catch arm 13 is positioned above, but not in contact with, striker 1, when in cocked position. It has no affect on the sensitivity of the trigger, but it prevents rotation of the striker if the trigger is accidentally actuated. The catch arm 13 is rotated away from the striker as shown in phantom in FIG. 1 to permit free movement of the striker after the set trap is positioned.

FIGS. 5 and 6 show an alternative embodiment of the invention in which the bait holder 7 is a flexible sheet or web which is simply stuck to the trigger 6.

Referring now to FIGS. 7–14, another embodiment of the invention is shown which employs a unique trigger mechanism in which the trigger 6 and bait holder 7 are fixed together and held above and spaced apart from the base 2 and arranged to pivot about a horizontal axis 24 parallel to bar 3 to spring the trap. A metal sheet is stamped out as shown in FIG. 9. A supporting tab 25 is struck out and bent downward to form a supporting leg at one side of the bait holder 7. Adhesive strips 26 may be applied as desired to provide a sticky surface to all or part of the bait holder. As the opposite side of the bait holder an extension 6 forms the trigger with a groove 27 on the underside for holding end 5 of hold down bar 3. Upward spring tension forces bar 3 upward in this groove so that both sides of bait holder 7 are held up above base 2. A staple 28 limits upward movement and defines the axis of rotation 24 of the combined bait holder and trigger. As shown in FIG. 7, the hold down bar 3 may optionally be provided with at least one upstanding spear point 14 to engage an animal not hit by the striker element.

As best seen in FIGS. 13 and 14, the trigger portion 6 has upturned edges 29 on both sides of groove 27. These form a smooth cam surface. While the spring bias action of bar end 5 tends to hold the bait holder up and the trap in cocked position, tilting of the bait holder to either side will, as shown in FIG. 14, permit the bar end 5 to fly upward, springing the trap. The bait holder 7 itself may assume many shapes. As shown here, the sides 30 may be bent up and one side may be provided with a depression 31 for holding the bait. The trap may be sprung by the animal sticking to the adhesive, pressing on either side of the bait holder, or unbalancing the holder by moving or removing some bait.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. An animal trap comprising:

A) a base;

B) a striker element pivotally mounted upon said base for spring-urged pivotal movement between a first cocked position and a second, striking and trapping position;

C) an elongate striker hold down means having a first end and a second end, said first end being pivotally connected to said base;

D) a trigger member pivotally connected to said base and releasably attached by attachment means to said second end of said hold down means when said striker element is in said cocked position;

E) bait holder means connected to said trigger member by connecting means, said bait holder means provided on at least a portion of the upper surface thereof with adhesive means arranged to stick to an animal, said bait holder arranged to actuate said trigger member to release said second end and spring said trap when said bait holder is moved by said animal.

2. The trap according to claim 1, in which said trigger member is integral with said bait holder means, said bait holder means being pivotally mounted on said base for pivotal rotation about an axis substantially parallel to said hold down means when in said cocked position, said attachment means arranged to release said second end when said bait holder means is tilted to either side from a center position.

3. The trap according to claim 2, in which said center position is maintained by spring bias transmitted through said hold down means.

4. The trap according to claim 1, in which said adhesive means is of a releasable nature, having sufficient tenacity to actuate said trigger member when an animal is stuck thereto and attempts to pull away, but not enough tenacity to prevent pulling said animal free of said adhesive.

5. The trap according to claim 1 further comprising a safety element pivotally attached to said base and having two operative conditions, a first safety condition in which a catch is positioned above, and not in contact with, said striker element when in said first cocked position to prevent said striker element from inadvertently moving to said second position, and a second, non-safety condition in which said striker element is allowed free movement.

6. The trap according to claim 1, in which said bait holder means comprises a web with adhesive coating on the upper surface thereof and said connecting means further comprises an extension of said web attached to said trigger member.

7. The trap according to claim 6, in which said web is attached by said adhesive coating to said trigger member.

8. The trap according to claim 1, in which said connecting means comprises a cord.

9. The trap according to claim 1 further comprising at least one upstanding spear point on said striker hold down means.

10. An animal trap comprising:

A) a base;

B) a striker element pivotally mounted upon said base for spring-urged pivotal movement between a first, cocked position and a second, striking and trapping position;

C) an elongate striker hold down means having a first end and a second end; said first end being pivotally connected to said base;

D) a bait holder means mounted upon said base for pivotal rotation about an axis substantially parallel to said hold down means when in said cocked position;

E) a trigger member attached to said bait holder means for rotation therewith, said trigger member arranged to cooperate with said second end to springably hold said bait holder means upright and centered while maintaining said cocked position and to release said second end and spring said trap when said bait holder means is rotated about said axis by animal movement.

11. The trap according to claim 10 further comprising a safety element pivotally attached to said base and having two operative conditions, a first safety condition in which a catch is positioned above, and not in contact with, said striker element when in said cocked position to prevent said striker element from inadvertently moving to said second position, and a second, non-safety condition in which said striker element is allowed free movement.

12. The trap according to claim 10, in which said bait holder means is provided on at least a portion of the upper surface thereof with adhesive means arranged to stick to an animal with sufficient tenacity to spring said trap when engaged by an animal.

13. The trap according to claim 10 further comprising at least one upstanding spear point on said hold down means.

14. The trap according to claim 10, in which said bait holder means is held above, and spaced apart from, said base in said cocked position by said second end of said hold down means at a first side of said bait holder means and by a downwardly extending projection from said bait holder means at a second, opposed side of said bait holder means.

* * * * *